United States Patent [19]
Paterson et al.

[11] Patent Number: 5,971,600
[45] Date of Patent: Oct. 26, 1999

[54] TRANSPORTABLE APPARATUS FOR COMBINING WASTE MATERIAL WITH A STABILIZER MATERIAL

[75] Inventors: Walter J. Paterson; Robert B. Pavlovec, both of Indiana, Pa.

[73] Assignee: North American Organics, Inc., Indiana, Pa.

[21] Appl. No.: 08/896,986

[22] Filed: Jul. 18, 1997

[51] Int. Cl.⁶ .................................................. B01F 15/02
[52] U.S. Cl. ...................... 366/150.1; 366/16; 366/183.1
[58] Field of Search .................... 366/16, 18, 27, 366/30, 33, 35, 41, 49, 50, 53, 68, 153.3, 152.1, 184, 325.1, 325.92, 261, 331, 606, 182.1, 183.1

[56] References Cited

U.S. PATENT DOCUMENTS

| | | | |
|---|---|---|---|
| 2,285,765 | 6/1942 | Carswell | 366/18 |
| 2,568,821 | 9/1951 | Perrot | 366/18 |
| 3,198,494 | 8/1965 | Curran et al. | 366/18 |
| 3,456,925 | 7/1969 | Gallagher | 366/27 |
| 3,941,357 | 3/1976 | Wurtz . | |
| 4,028,130 | 6/1977 | Webster et al. . | |
| 4,140,246 | 2/1979 | Frankie | 366/153.3 |
| 4,304,493 | 12/1981 | Frankie | 366/253.3 |
| 4,306,978 | 12/1981 | Wurtz . | |
| 4,432,800 | 2/1984 | Kneller et al. . | |
| 4,554,002 | 11/1985 | Nicholson . | |
| 4,638,971 | 1/1987 | Basinsky et al. | 366/16 |
| 4,712,919 | 12/1987 | Bouldin | 366/16 |
| 4,781,842 | 11/1988 | Nicholson . | |
| 4,902,431 | 2/1990 | Nicholson et al. . | |
| 4,997,572 | 3/1991 | Wurtz | 210/710 |
| 5,005,980 | 4/1991 | Zimmerman | 366/153.3 |
| 5,044,819 | 9/1991 | Kiheffer et al. | 366/18 |
| 5,135,664 | 8/1992 | Burnham . | |
| 5,275,733 | 1/1994 | Burnham . | |
| 5,294,065 | 3/1994 | Harms et al. . | |
| 5,360,143 | 11/1994 | Stultz | 222/94 |
| 5,401,402 | 3/1995 | Christy et al. | 366/152.1 |
| 5,417,861 | 5/1995 | Burham . | |

OTHER PUBLICATIONS

Joseph B. Farrell, et al., "Lime stabilization of primary sludges", Journal WPCF, vol. 48, No. 1, Jan. 1974.
"Portable Pugmill Plus" (publication and publication date unknown).

*Primary Examiner*—Tony G. Soohoo
*Attorney, Agent, or Firm*—Sixbey, Friedman, Leedom & Ferguson, P.C.; Donald R. Studebaker

[57] ABSTRACT

A transportable apparatus for intimately combining a waste material with a stabilizer material comprises a first reservoir for receiving, containing, and discharging a waste material. The first reservoir has an inlet for receiving the waste material, an interior for containing the waste material, and an outlet for discharging waste material. The present invention also comprises a means for controllably discharging the first reservoir. The present invention also comprises a second reservoir for receiving, containing, and discharging a stabilizer material. The second reservoir also has an inlet for receiving the stabilizer material, an interior for containing the stabilizer material, and an outlet for discharging the stabilizer material. The present invention further comprises a means for controllably discharging the second reservoir. Some embodiments of the present invention may also comprise a plow blender for intimately combining the waste material discharged from the first reservoir with the stabilizer material discharged from the second reservoir. Alternatively, a transportable apparatus of the present invention is an accessory to a plow blender. The present invention also comprises a superstructure for fixing the first and second reservoirs and a plow blender in positions relative to each other. The superstructure has means adapted for transporting the transportable apparatus from one location to another.

54 Claims, 8 Drawing Sheets

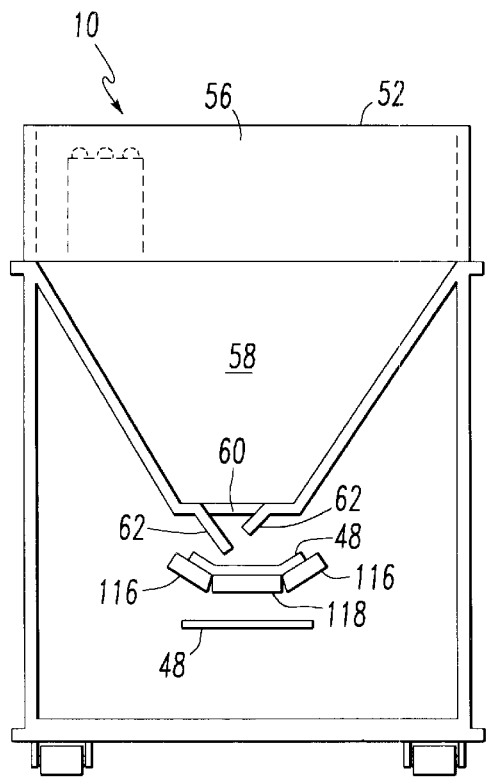 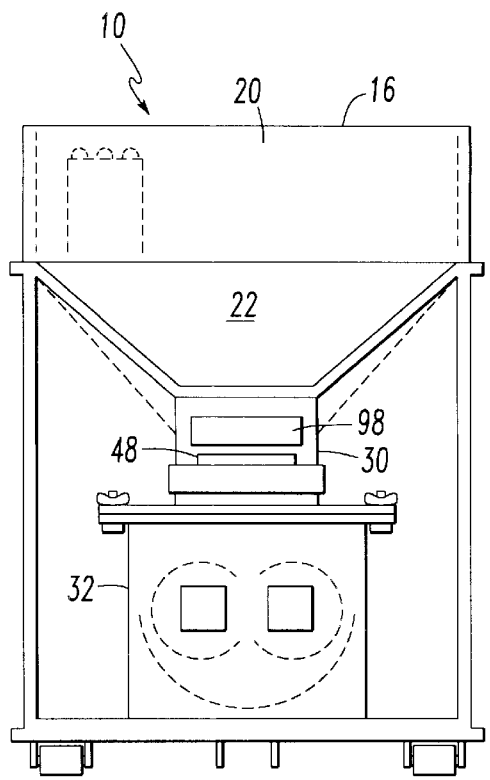
FIG.8  FIG.9
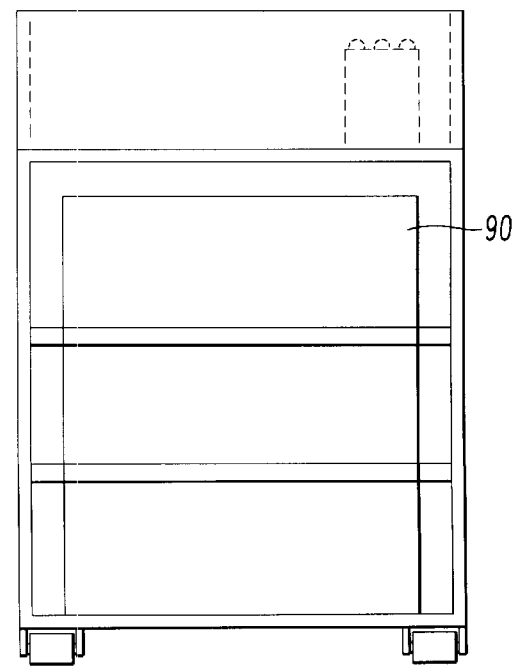
FIG.10

TRANSPORTABLE APPARATUS FOR COMBINING WASTE MATERIAL WITH A STABILIZER MATERIAL

BACKGROUND OF THE INVENTION

1. Field of the Invention

The present invention relates to a transportable apparatus for intimately combining a waste material with a stabilizer material. More specifically, the present invention relates to a transportable apparatus which incorporates a plow blender for intimately combining a waste material with a stabilizer material. The present invention also relates to a transportable accessory for use with a plow blender for intimately combining a waste material with a stabilizer material.

2. Description of the Prior Art

There is a great need for stabilizing waste materials to make them relatively innocuous to the environment prior to their ultimate disposal. Such waste materials include sludges resulting from the processing of human and animal wastes, for example, sewage and agricultural sludges and manures. Such waste materials also include small particulate mining and industrial waste products which are often stockpiled or are deposited as slurries in storage ponds or lagoons.

A common characteristic of such waste materials is that they are unstable in a biological or chemical sense to a degree that disposal of these waste materials in an untreated form poses hazards to the environment. For example, untreated sewage sludge contains biologically active pathogens along with heavy metal contaminants, the exposure to any of which may endanger the health of human, animal, or plant life. Such exposure may result from direct contact with the waste material or indirectly through the leaching of contaminants from the waste material into water supplies from runoff into streams, rivers, lakes, and reservoirs, or through see page into the water table.

Another common characteristic of such waste materials is that they are finely-divided, particulate, or sludge-like in physical form. The physical form of these waste materials, therefore, enhances their instability. It also increases their ability to escape from containment structures and to migrate to where they might cause the most damage to the environment.

It has long been known that combining such waste materials with a stabilizer material can render the waste materials more stable or otherwise more innocuous to the environment, thereby reducing the potential environmental hazards associated with the ultimate disposal of such waste materials. A characteristic of effective stabilizer materials is that they have a physical form amenable to permitting intimate combination with waste materials. Thus, suitable stabilizer materials must be of a finely-divided, particulate, or sludge-like physical form. Another characteristic of such stabilizing materials is the ability to physically, chemically, or biologically interact with waste materials in such a way as to render the waste materials more stable or otherwise more innocuous to the environment. Calcium-rich or magnesium-rich powders, especially those containing oxides and hydroxides of these alkaline earth elements, such as lime, lime kiln dust, cement kiln dust, fly ash, slag fines, and pulverized calcium carbonate are illustrative examples of such stabilizing materials. For example, Nicholson, U.S. Pat. No. 4,554,002, teaches that mixing lime kiln dusts with sewage sludge reduces the pathogens and decreases the leachability of the heavy metal contaminants contained in the sewage sludge such that the resulting product may be used as a fertilizer.

The plow bender as described by Wurtz, U.S. Pat. No. 3,941,357, has been found to be a particularly effective device for combining waste materials with stabilizer materials. A plow blender is a dual shaft mixer capable of mixing all types of materials from dry to semi-solid to viscous liquids providing uniform shear, uniform work input and uniform particle temperature. Attached to each of the plow blender's two counter-rotating shafts are plow-shaped, double-wedge working tools. The dual shafts and the attached working tools are so arranged that the paths of the working tools on the two shafts overlap and so that the working tools mounted on one shaft coming in proximity to the shaft of the second set of working tools, and vice versa, thus creating zones of interaction between the sets of working tools.

Materials fed into the plow blender are intimately combined by the action of the working tools as the materials are worked through the plow blender and then discharged. Thus, the plow blender is capable of intimately combining the waste materials with stabilizer materials thoroughly and homogeneously. Additionally, the plow blender is capable of bringing waste materials and stabilizer materials into intimate contact thereby producing an intimate combination of these materials and thus enhancing the ability of the stabilizer material to render the waste material more innocuous to the environment.

The utility of the plow blender has been recognized for intimately combining some waste materials with some stabilizer materials. For example, Wurtz, U.S. Pat. No. 4,306,978, describes the use of the plow blender for intimately combining lime with sewage sludge to destroy pathogenic organisms resident in the sewage sludge.

Previously, however, the use of a plow blender has required the investment in costly physical plant facilities, such as the expense of purchasing and maintaining dedicated equipment such as the plow blender, and the storage equipment for the waste materials and the stabilizer materials at each waste material processing facility. It also has been necessary to dedicate a significant amount of the floor space of the facility to the waste material processing equipment and its operation. The associated costs and the limited amount of floor space at existing waste producing sites, especially at the older municipal sewage treatment plants and small factories, made it difficult or expensive to utilize this technology for rendering the waste materials produced at these sites less harmful to the environment. In addition the disposal of the untreated waste material, for example, by disposal into landfills, is expensive and potentially hazardous to the environment.

Furthermore, the need for the use of a permanent structure to house and operate the equipment greatly discourages the use of this technology for stabilizing waste materials on-site at land fills or at remote mining sites. The costs associated with such a permanent structure makes employing this technology to process waste materials economically unattractive to the owners of smaller industrial plants, mining operations, and farms.

Furthermore, some waste material producers may already have a plow blender which could be more effectively utilized if it could be used at more than one location. Presently, however, it was necessary for these waste material producers either to transport all the waste materials to a central location or to deinstall, move, and reinstall the plow blender at each location and to maintain dedicated supplemental equipment at each location for use with the plow blender.

What is lacking in the art, therefore, is a transportable, self-contained unit for intimately combining waste materials with stabilizer materials that can be employed at a waste producing site on an as-needed basis without requiring the permanent dedication of floor space. What is needed is a self-contained unit for intimately combining waste materials with stabilizer materials that can be moved from one waste producing site to another thus making it possible to spread the cost associated with the equipment among many users. What is needed is a self-contained unit for intimately combining waste materials with stabilizer materials that is adapted to be easily moved from one place to another, for example, from one land fill cell to another, from one farm to another, from one industrial plant to another, from one remote mining site to another, from a land fill to a farm, from a farm to an industrial plant, and so on. What is needed is a self-contained, transportable unit in which the plow blender can be mounted which has ancillary equipment necessary for the operation of the plow blender. What is needed is a transportable accessory to a plow blender which has reservoirs for receiving, containing, and discharging the waste materials and the stabilizer materials into the plow blender, as well as a means for controlling the discharges of these reservoirs.

BRIEF SUMMARY OF THE INVENTION

A transportable apparatus for intimately combining a waste material with a stabilizer material is disclosed comprising a first reservoir for receiving, containing, and discharging a waste material. The first reservoir has an inlet for receiving the waste material, an interior for containing the waste material, and an outlet for discharging of waste material. The apparatus also comprises a means for controllably discharging the first reservoir. The device also comprises a second reservoir for receiving, containing, and discharging a stabilizer material. The second reservoir has an inlet for receiving the stabilizer material, an interior for containing the stabilizer material, and an outlet for discharging the stabilizer material. The apparatus comprises a means for controllably discharging the second reservoir, and may further comprise a plow blender for intimately combining the waste material discharged from the first reservoir with the stabilizer material discharged from the second reservoir. The apparatus comprises a superstructure for fixing the first and second reservoirs and a plow blender in positions relative to each other. The superstructure has means adapted for transporting the transportable apparatus from one location to another.

Waste materials which may be processed by the transportable apparatus include, but are not limited to, sludges resulting from the processing of human and animal wastes, for example, sewage and agricultural sludges and manures. Such waste materials also include small particulate mining and industrial waste products which are often stockpiled or are deposited as slurries in storage ponds or lagoons.

Stabilizer materials which may be used in the operation of the transportable apparatus are materials which can render the waste materials more stable or otherwise more innocuous to the environment, thereby reducing the potential environmental hazards associated with the ultimate disposal of such waste materials. A characteristic of an effective stabilizer material is that it has a physical form amenable to permitting intimate combination with waste materials. Thus, a stabilizer material must be of a finely-divided, particulate, or sludge-like physical form. It is contemplated that the particle size of the stabilizer material will be about $\frac{1}{8}$ inch in diameter or smaller. Another characteristic of such a stabilizing material is its ability to physically, chemically, or biologically interact with waste materials in such a way as to render the waste materials more stable or otherwise more innocuous to the environment. Calcium-rich or magnesium-rich powders, especially those containing oxides and hydroxides of these alkaline earth elements, such as lime, lime kiln dust, cement kiln dust, fly ash, slag fines, and pulverized calcium carbonate are illustrative examples of such stabilizing materials.

It is to be understood that a stabilizer material contemplated for use with the present invention may be comprised of a combination of one or more individual types of stabilizer materials. The individual types of stabilizer materials may be combined into a single master stabilizer material or they can be loosely combined during conveyance to the plow blender or they may be added separately or even alternatively to the plow blender. For example, the individual types of stabilizer materials A and B can be blended together into master stabilizer material C and fed into a single reservoir for subsequent discharge directly or indirectly into the plow blender. Alternatively, multiple reservoirs may be incorporated into a transportable apparatus constructed in accordance with the present invention, each containing a stabilizer material comprised of one or more types of stabilizer materials, which discharge directly or indirectly the plow blender. For example, one reservoir may be used for stabilizer material A and another reservoir may be used for stabilizer material B and these two reservoirs may discharge simultaneously or alternatively directly or indirectly into the plow blender. Thus, it is contemplated that a transportable apparatus constructed according to the present invention may contain one or more reservoirs for receiving, containing, and discharging stabilizer material into a plow blender. It is further contemplated that a transportable apparatus constructed according to the present invention also includes a means for controllably discharging each such reservoir.

It is also to be understood that the product exiting the plow blender resulting from the intimate combination by the plow blender of a waste material and a stabilizer material may itself be capable of rendering additional waste material of the same type or waste materials of a different type or types more innocuous to the environment upon intimate combination therewith so that, the product material itself may also be used as a stabilizer material.

Likewise, it is also to be understood that a waste material may be comprised of a combination of one or more individual types of waste materials. The combination of individual types of waste materials into a single waste material can be made at any time. For example, the individual types of waste materials can be blended together and fed into a single reservoir for subsequent discharge directly or indirectly into the plow blender. Alternatively, multiple reservoirs may be incorporated into a transportable apparatus, each containing a waste material comprised of one or more types of waste materials, which, either simultaneously or alternatively, discharge directly or indirectly the plow blender. Thus, it is contemplated that a transportable apparatus may contain one or more reservoirs for receiving, containing, and discharging waste material into a plow blender. It is further contemplated that a transportable apparatus constructed according to the present invention also includes a means for controllably discharging each such reservoir.

Each of the reservoirs for the waste material and the stabilizer material may be of any design, size, and material of construction known to one skilled in the art of material handling which would be suitable for the particular waste materials and stabilizer materials to be used with the particular transportable apparatus constructed in accordance with the present invention. Each reservoir has at least one inlet for receiving the waste material or stabilizer material, an interior section for containing the waste or stabilizer material, and at least one outlet for discharging the waste material or stabilizer material. The relative and actual sizes of the inlets, interior section, and outlets for each reservoir may be designed to accommodate the particular applications for which the particular transportable apparatus is to be used as will be discussed in more detail with reference to the preferred embodiments.

Covers may be provided to at least partially close the inlets of the reservoirs, or to help contain the waste or stabilizer materials or dusts associated therewith, or to prevent foreign materials or objects from entering the reservoirs. The covers may be of any appropriate design or material known to one skilled in the art of material handling. It is also contemplated that such covers may incorporate air filters to filter out dusts or odors rising from the waste or stabilizer material reservoirs. The covers may include an opening for ingress or introduction of the waste or stabilizer material into the reservoir.

The reservoirs for the waste material and the stabilizer materials may optionally contain agitator devices such as spinning or oscillating agitator bars for agitating the materials contained within the reservoir. Agitation of some materials may be used to prevent material bridging or to otherwise aid the movement of the material through the reservoir.

To aid the movement of the waste material and stabilize material through the reservoirs, part or all of one or more inside surfaces of each reservoir may be provided with a covering of a material having a low coefficient of friction. For example, sheets of high density polyethylene may be used to cover the inside surfaces of the reservoirs. It is to be specifically noted that the low coefficient of friction covering also may be in the form of a film.

The means for controllably discharging materials from the waste material and stabilizer material reservoirs may be any means of controllably discharging materials from reservoirs known to those skilled in the art of material handling. Examples of such discharging means include all types of valves which can be adapted to control the flow of finely-divided, particulate, or sludge-like materials, as well as all types of conveyor systems capable of conveying finely divided, particulate, or sludge-like materials in which control of the speed of material conveyance can be used to regulate the discharge from a reservoir.

A transportable apparatus may also include a means for conveying the waste material and stabilizer material discharging from their respective reservoirs to the plow blender inlet. Such conveying means include all those known to a person skilled in the art of material handling. Examples of such conveying means include, but are not limited to conveyor belts, augers, chutes, conduits, and pneumatic transfers systems.

The superstructure of a transportable apparatus constructed in accordance with the present invention may be of any appropriate design and material of construction known to one skilled in the art of equipment or structural design. The superstructure fixes the relative positions of the waste and stabilizer material reservoirs and the plow blender both during the transportation of the transportable apparatus and during the operation of the transportable apparatus. However, it is not necessary that these relative positions be the same during transportation as they are during operation of the transportable apparatus. Furthermore, it is also contemplated by the present invention that the superstructure may include means by which the relative positions of the waste material and stabilizer material reservoirs and the plow blender may be adjustably fixed with relation to one another, such as equipment positioners powered by hydraulic, pneumatic, mechanical or electrical motors or mechanisms.

The superstructure must have sufficient strength and durability to support the various components of the transportable apparatus during transportation and operation of the transportable apparatus. It is contemplated that the various components of the transportable apparatus may be either permanently or removably affixed to the superstructure. It is also contemplated by the present invention that some components of the transportable apparatus, such as the reservoirs for the waste and stabilizer materials, in some embodiments may be integral parts of the superstructure.

As mentioned, the superstructure of the transportable apparatus has means adapted for transporting the transportable apparatus from one location to another. All such transporting means, known to one skilled in the art of transportation, are within the contemplation of the present invention. For example, a transportable apparatus may be provided with means by which the transportable apparatus can be loaded onto or pulled by a truck or some other motorized vehicle. A transportable apparatus may be provided with transporting means by which the transportable apparatus can be moved by rail transit or by boat by which the transportable apparatus can be transported by any combination of suitable means of transportation known to one skilled in the art of transportation. Such means include, but are not limited to, wheels, rollers, skids, rails, hooks, lifting lugs or bars, pulling lugs or bars, floatation hulls, and any combination thereof.

Furthermore, inasmuch as it is also contemplated that the size of the transportable will depend on the needs of the application for which a particular transportable apparatus is to be used, it is further contemplated that the means adapted for transporting the transportable apparatus will be appropriate for the size of the particular transportable apparatus. Additionally, the means adapted for transporting the transportable apparatus may be either a permanently attached part of the superstructure of the transportable apparatus or be a removable part of the superstructure. It is also within the contemplation of the present invention that the means adapted for transporting the transportable apparatus be retractable.

A transportable apparatus constructed in accordance with the present invention meets the need for a transportable, self-contained unit for intimately combining waste materials with stabilizer materials that can be employed at a waste producing site on an as-needed basis without requiring the permanent dedication of floor space. The transportability of a transportable apparatus permits the transportable apparatus to be moved into any available suitable location at a waste producing site where it can be operated to process waste material. After the waste material has been processed, the transportable apparatus can then be moved to another site for operation or can be moved to a storage site. The transportability of the transportable apparatus permits the transportable apparatus to be moved out of the way whenever the need arises.

The transportability enables the transportable apparatus to be easily moved from one place to another. This feature makes the transportable apparatus especially useful and effective for use in processing waste materials at a land fill, where it can be moved into place at an operating cell and later moved on to the next cell when the first cell is closed. The transportability makes it possible to move the transportable apparatus from one to another, from one remote industrial plant to another, from one remote mining site to another, from a land fill to a farm, from a farm to an industrial plant, and so on.

Furthermore, the transportability of the transportable apparatus makes it possible to spread the equipment cost associated with processing waste materials among multiple users. The transportability makes it possible, for example, for a group of small municipal sewage plants, small farmers, industrial plants, or mining operations, or any combination thereof, to form a cooperative association to share the costs of owning and operating the transportable apparatus of the invention. Alternatively, cost sharing may be effected by a contractor acquiring the transportable apparatus of the present invention and then transporting the transportable apparatus to several waste material producers for use at their locations for a fee.

Additionally, the self-contained nature of a transportable apparatus constructed in accordance with the present invention may reduce the costs associated with using a plow blender to process waste materials by combining into one unit the essential auxiliary equipment needed to operate the plow blender. A transportable apparatus constructed in accordance with the present invention, as an accessory to a plow blender, also enhances the utility of a plow blender by making it possible utilize the plow blender in various locations which may be at or near the places where the waste material is produced or is to be ultimately disposed. Thus, though a transportable apparatus constructed in accordance with the present invention may include a plow blender, such a transportable apparatus may also be constructed to receive a plow blender or to otherwise be used in conjunction with an existing plow blender as an accessory to the plow blender.

These and other advantages and features of the present invention will be more fully understood with reference to the presently preferred embodiments thereof and to the appended drawings.

BRIEF DESCRIPTION OF THE DRAWINGS

FIG. 8 is a cross-sectional view taken at line VIII—VIII of the first embodiment of the invention.

FIG. 9 is a cross-sectional view taken at line IX—IX of the first embodiment of the invention.

FIG. 10 is an end view of the rear end of the first embodiment of the present invention.

DESCRIPTION OF PREFERRED EMBODIMENTS

Figure 1:
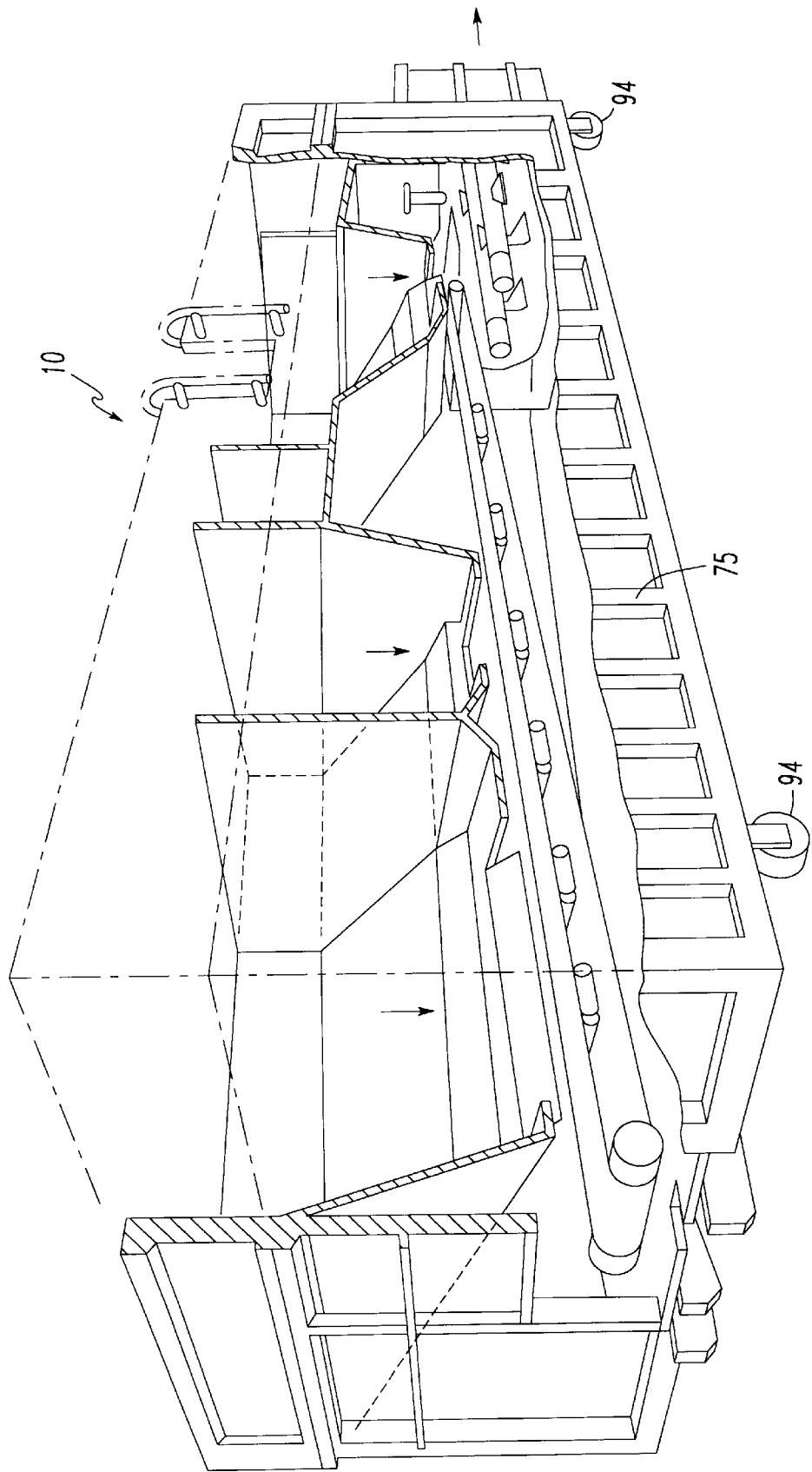
FIG. 1 is a perspective view, partially in cross-section, of a first embodiment of the present invention.
Figure 2:
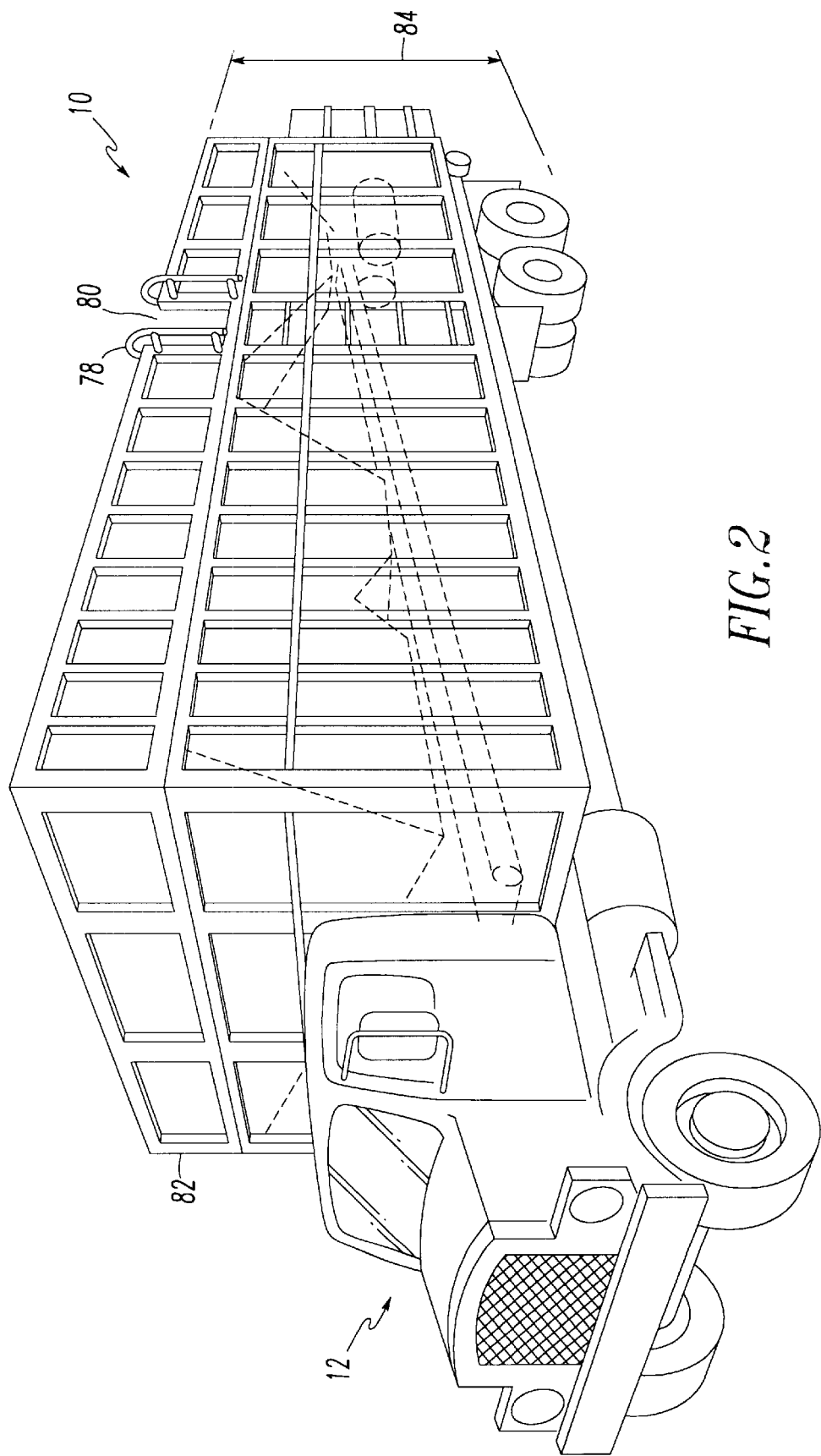
FIG. 2 is a perspective view showing the first embodiment of the present invention illustrated in FIG. 1 being transported by truck.

Referring to the drawings, wherein like reference numerals designate like or corresponding parts throughout the several views, FIG. 1 depicts, in partial cross-section, a perspective view of a presently preferred embodiment of a transportable apparatus 10 for intimately combining a waste material with a stabilizer material in a form which has been adapted to be transportable by truck. FIG. 2 shows the transportable apparatus 10 loaded onto a truck 12 for transportation.

Figure 3:
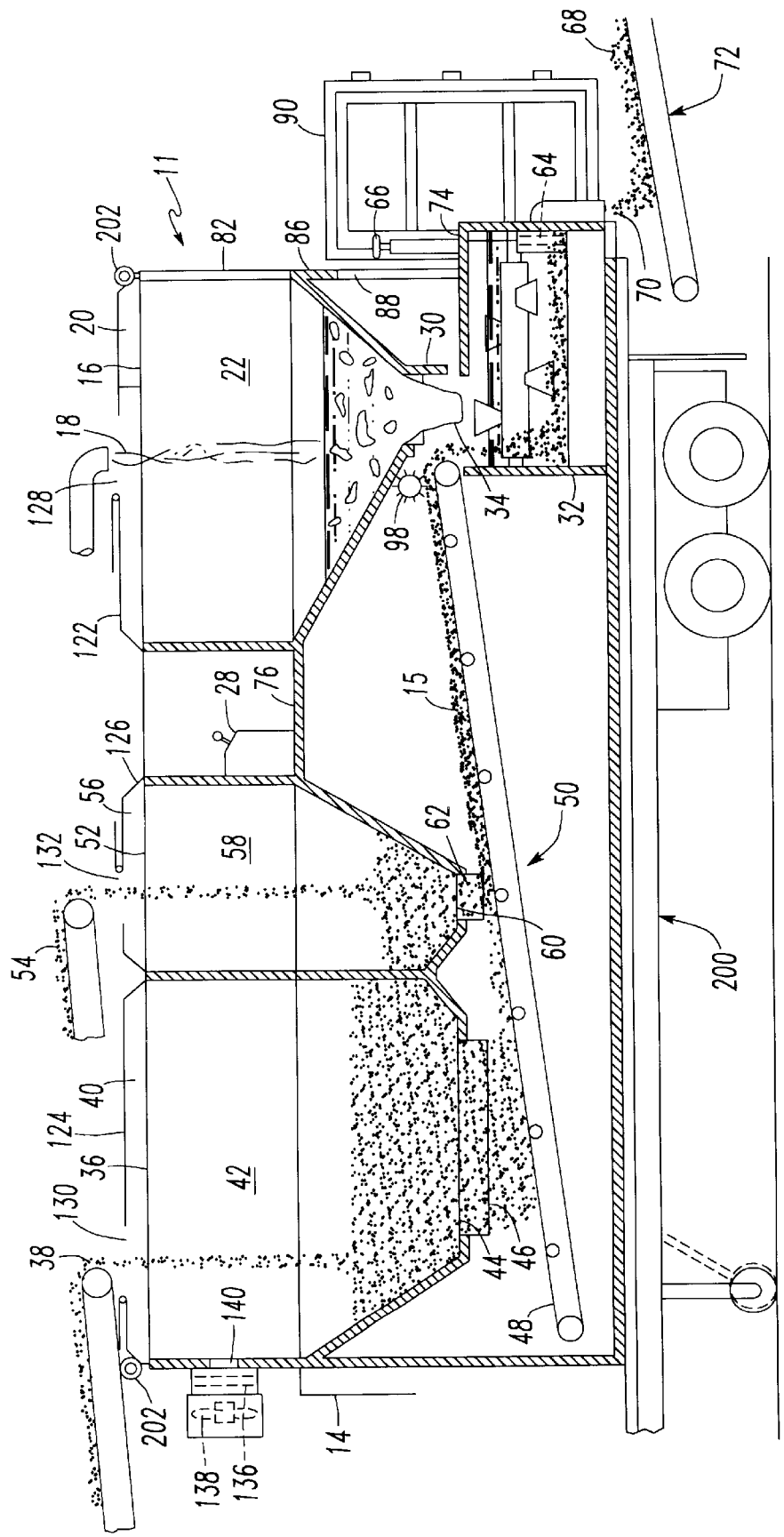
FIG. 3 is a cross-sectional right side view of a second embodiment of the present invention situated upon a truck trailer during the operation of the embodiment.

With references now to FIGS. 1 and 3, a cross-sectional right side view illustrates the device in operation. In this first embodiment, the three process material reservoirs, that is, first reservoir 16, second reservoir 36, and auxiliary reservoir 52 are employed all of which are integral to the superstructure 12. One of the three process material reservoirs is for waste material 18 and the other two are for a first stabilizer material 38 and a second stabilizer material 54 which together comprise stabilizer material 15.

First reservoir 16 receives, contains, and discharges a waste material 18. Waste material 18 enters first reservoir 16 through first reservoir inlet 20. Waste material 18 is contained in first reservoir interior 22 until it is discharged through first reservoir outlet 24. First gate valve 26 is located at first reservoir outlet 24 as a means of controllably discharging first reservoir 16. First gate valve 26 is operated from control station 28 using a hydraulic system. The discharged waste material 18 is then conveyed by gravity through chute 30. Waste material 18 then enters into plow blender 32 through plow blender inlet 34.

Second reservoir 36 receives, contains, and discharges a first stabilizer material 38. First stabilizer material 38 enters second reservoir 36 through second reservoir inlet 40. First stabilizer material 38 is contained in second reservoir interior 42 until it is discharged through the second reservoir outlet 44. Second gate valve 46 is located at second reservoir outlet 44 as a means of controllably discharging second reservoir 36. Second gate valve 46 is operated from control station 28 using a hydraulic system. The discharged first stabilizer material 38 then drops onto conveyor belt 48 for conveyance to chute 30 from which it enters into plow blender 32 through plow blender inlet 34.

Auxiliary reservoir 52 receives, contains, and discharges an optional second stabilizer material 54. Second stabilizer material 54 enters auxiliary reservoir 52 through auxiliary reservoir inlet 56. Second stabilizer material 54 is contained in auxiliary reservoir interior 58 until it is discharged through auxiliary reservoir outlet 60. Auxiliary gate valve 62 is located at auxiliary reservoir outlet 60 as a means of controllably discharging auxiliary reservoir 52. Auxiliary gate valve 62 is operated from control station 28 using a hydraulic system. The discharged second stabilizer material 54 then drops onto conveyor belt 48 for conveyance to chute 30 from which it enters into plow blender 32 through plow blender inlet 34.

It is to be understood that when multiple types of stabilizer materials are used, second reservoir 36 and auxiliary reservoir 52 may be operated separately, simultaneously, or alternatively. Furthermore, the designations given to first reservoir 16, second reservoir 36, and auxiliary reservoir 52 with regard to the type of process material are to be considered interchangeable. Any of the process material reservoirs may be used with any of the process materials. For example, in a particular operation, it may be more beneficial to feed waste material 18 through second reservoir 36 or auxiliary reservoir 52 and to feed first stabilizer material 38 through first reservoir 16 and to make no use of the remaining reservoir.

The starting and stopping of the plow blender 32 is controlled from control panel 28. The throughput rate of the plow blender 32 is controlled by setting the position of plow blender gate valve 64 by way of control wheel 66 located on the top of plow blender exit end 74.

Figure 11:
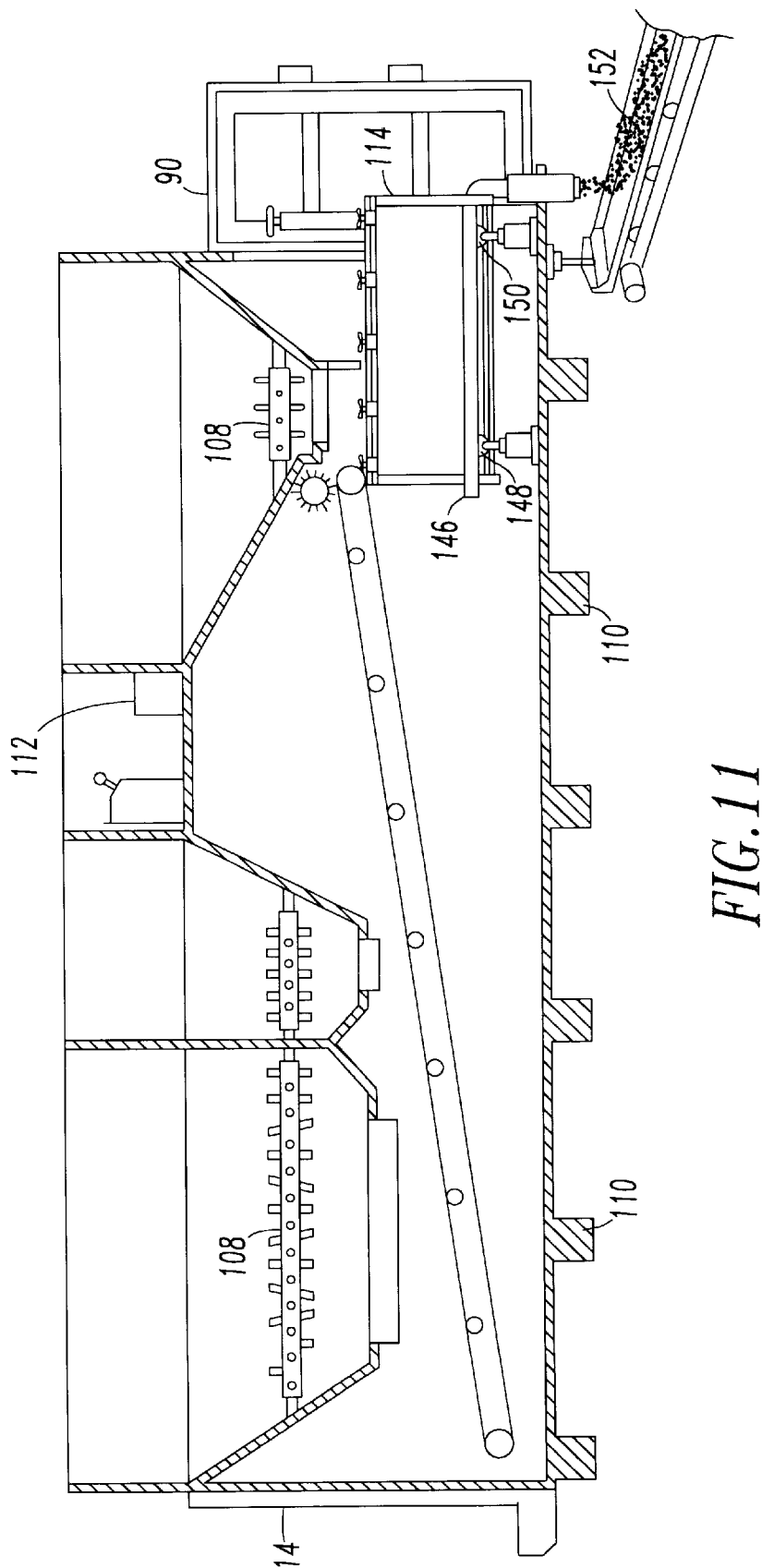
FIG. 11 is a offset cross-sectional right view of a third embodiment of the present invention.

During passage through plow blender 32, waste material 18 is intimately combined with stabilizer material 15. The resulting stabilized product mixture 68 exits plow blender discharge 70. Stabilized product mixture 68 may then be transported away by product conveyor belt system 72 or by any conveyance means known to one skilled in the art of material handling, for example, by product chute 152, which is removably attached to superstructure 14, as shown in FIG. 11. The resulting stabilized product mixture 68 is typically granular though the actual consistency and form of stabilized product mixture 68 depend on the materials being processed, the volume ratios of the stabilizer material 15 to the waste material 18, and the mixing throughput rate used for plow blender 32. Preferably, the volume ratio of stabilizer material 15 to waste material 18 is between about 2:1 to about 3:1.

The mixing throughput rate used for plow blender 32 depends on the size of the plow blender 32, the stabilizer material, the waste material, and the stabilizer material to waste material ratio and thus is determined on a case by case basis. For example, when a transportable apparatus including a Willowtech™ Model D3100 plow blender, manufactured by Ashbrook Corporation, Houston, Tex., is used to stabilize a waste material consisting of a sewage sludge having a 25–30% solids content by combining it in the manner described herein with a stabilizer material consisting of dehydrated lime such that the stabilizer material to waste material volume ratio is about 3:1, the mixing throughput rate is on the order of about 50 tons per hour.

Superstructure 14 shown in FIG. 1 is of a unit-body construction design and constructed of steel. Superstructure 14, employs ribbing 75 as a structural reinforcing element. The three process material reservoirs, i.e., first reservoir 16, second reservoir 36, and auxiliary reservoir 52, are integral to superstructure 14. Superstructure 14 contains control deck 76 upon which is located the control panel 28. Ladder 78 is included on the right side of superstructure 14 to provide access to control deck 76 through control deck accessway 80. Superstructure 14 may optionally include a height extension 82 which adds additional capacity to the process material reservoirs and also provides a safety wall around control deck 76. More preferably, when included as part of transportable apparatus 10 of the present invention, height extension 82 is a separable portion of superstructure 14 which is able to be retracted or removed to decrease total traveling height 84 of transportable apparatus 10 and its transporting vehicle, e.g. truck 12.

Referring now to FIG. 3, superstructure 14 includes at its rear end 86 a rear access opening 88 through which plow blender exit end 74 extends. In this embodiment, a box door 90 is hingeably attached to superstructure 14 so as to be able to enclose rear access opening 88 when box door 90 is in a closed position. During operation, box door 90 is swung open to provide access to plow blender 32. The device also includes a front access opening 92 in superstructure 14 through which access is provided to conveyor system 50.

Figure 4:
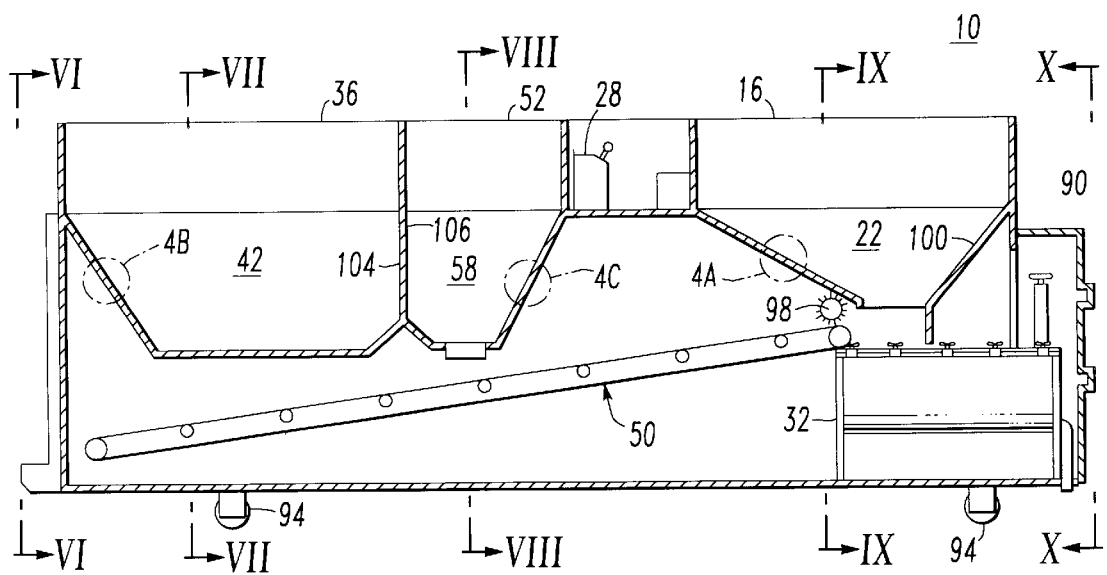
FIG. 4 is an offset cross-sectional right side view of the first embodiment of the present invention.
Figure 5:
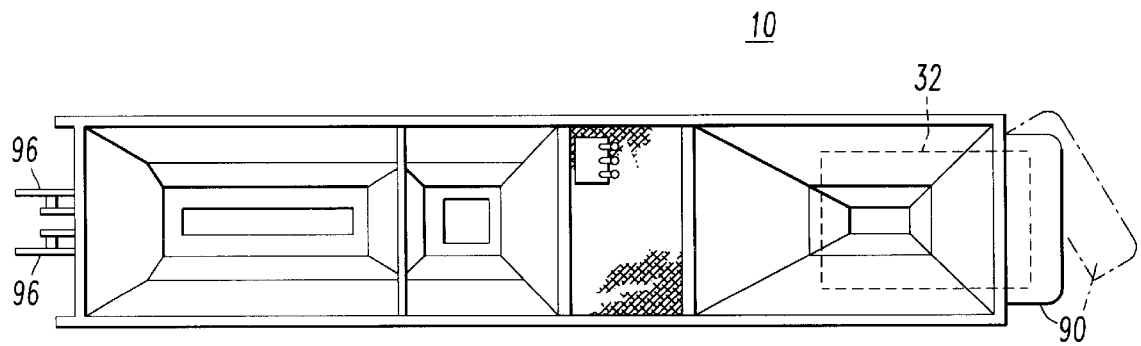
FIG. 5 is a top view of the first embodiment of the present invention showing in the end cover closed and alternatively in a partially open position.

As shown in FIGS. 4 and 5, superstructure 14 has means adapted for transporting the transportable apparatus 10 most preferably consisting of four wheel assemblies 94 and two front yokes 96. In operation, a pulling device, such as a winch assembly on the transporting vehicle, e.g. truck 12, removably attaches to two front yokes 96. As the pulling device is employed, the transportable apparatus 10 rides on its wheel assemblies 94 up rails onto truck 12. The rails are leveled into a horizontal position and secured for transit.

Figure 12:
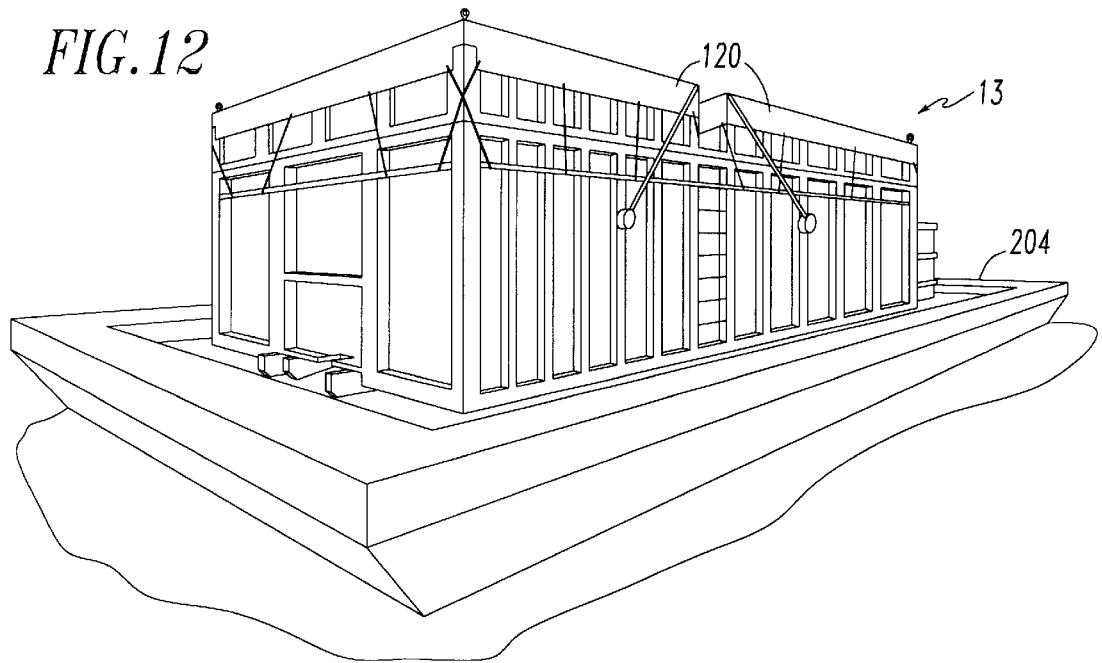
FIG. 12 is a perspective view of a fourth embodiment of the present invention situated upon a barge.

FIG. 3 illustrates a second embodiment in which alternate transportable apparatus 11 has been adapted for transportation by truck trailer 200. In this embodiment, the means adapted for transporting transportable apparatus 11 include lifting lugs 202 as part of the superstructure 14. Lifting lugs 202 may be an attached or integral part of superstructure 14. Lifting lugs 202 allow alternate transportable apparatus 11 to be lifted by a crane onto a transport vehicle such as a railroad car, or a truck trailer 200 as shown in FIG. 3. Lifting lugs 202 may also be used to load second alternate transportable apparatus 13 onto a barge 204 as shown in FIG. 12. Another example of a means adapted for transporting for use with the present invention is skids 110 shown in FIG. 11. Skids 110 may be an attached or integral part of superstructure 14. Skids 110 allow third alternate transportable apparatus 17 to be lifted by a fork lift or a crane onto a transport vehicle.

Figure 4A:
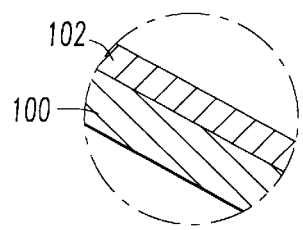
FIG. 4A is a cross-sectional view of a detail of FIG. 4 showing the inside wall of the first reservoir.
Figure 4B:
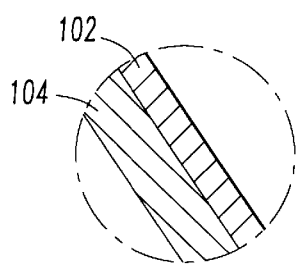
FIG. 4B is a cross-sectional view of a detail of FIG. 4 showing the inside wall of the second reservoir.
Figure 4C:
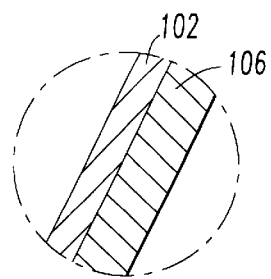
FIG. 4C is a cross-sectional view of a detail of FIG. 4 showing the inside wall of the auxiliary reservoir.

Preferably, a low friction material is used to line the inside surface of each of the process material reservoirs. For example, first reservoir 16 has first reservoir inside surface 100 coated with high density polyethylene sheets 102 as shown in FIG. 4A. Similarly, second reservoir 36 has second reservoir inside surface 104 covered with high density polyethylene sheets 102 and auxiliary reservoir 52 has auxiliary reservoir inside surface 106 covered with high density polyethylene sheets 102 as shown, respectively, in FIGS. 4B and 4C.

In the third embodiment depicted in FIG. 11, agitators in the form of spinning agitator bars 108 are included in each of the process material reservoirs. The spinning agitator bars 108 act to agitate the process materials to prevent bridging or to otherwise aid in the movement of the process material through the reservoir. In this embodiment of the present invention, spinning agitator bars 108 are driven by a drive train and motor and are controlled from control panel 28.

Referring now to FIG. 12, covers 120 are removably attached to superstructure 14 to cover the process material reservoirs. Covers 120 can be used to during transportation of the alternate transportable apparatus 1 to prevent foreign materials or objects from entering the process material reservoirs. During operation, covers 120 may serve the additional purpose of helping to contain the process materials, for example, waste material 18, first stabilizer material 38, or auxiliary stabilizer material 54. Covers 120 may also restrict the egress of dusts or odors emanating from the process materials. Covers 120 may be made of any suitable material and design known to one skilled in the art of equipment or structural design for accomplishing any or all of the aforementioned purposes of containment and exclusion of foreign materials. For example, covers 120 may be constructed of flexible materials such as waterproof cloth or canvas, or plastic film or more rigid materials such as structural plastics or metals such as steel or aluminum alloys, or may be constructed of a combination of materials.

Figure 13:
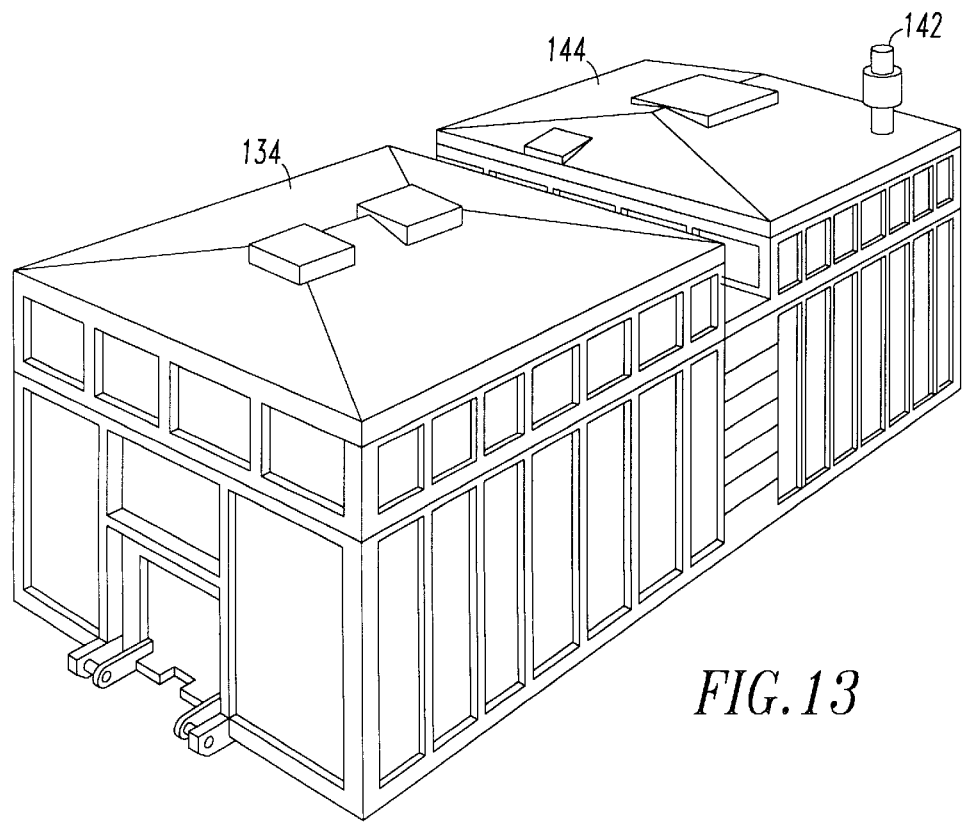
FIG. 13 is a perspective top view of a fifth embodiment of the present invention.

More preferably, as shown in FIG. 3, first reservoir 16 is covered by first reservoir cover 122, second reservoir 36 is covered by second reservoir cover 124, and auxiliary reservoir 52 is covered by auxiliary reservoir cover 126. First reservoir cover 122 is provided with first reservoir cover inlet port 128 for admitting waste material 18 whenever first reservoir cover 122 is kept in place during operation. Similarly, second reservoir cover 124 is provided with second reservoir cover inlet port 130 and auxiliary reservoir cover 126 is provided with auxiliary cover inlet port 132. Alternatively, a single cover may be used to cover multiple reservoirs. For example, FIG. 13 shows an embodiment of the present invention in which a dual reservoir cover 134 is used to cover both second reservoir 36 and auxiliary reservoir 52.

An embodiment may optionally include one or more filters for removing dusts or odors emanating from one or more of the process material reservoirs. FIG. 3 shows a second embodiment in which air filter 136 and exhaust fan 138 are attached to superstructure 14. Exhaust fan 138 draws dust or odor laden air from second reservoir 36 through air exhaust port 140 and then through air filter 136 to remove dust or odor that arise from the first stabilizer material 38 contained within second reservoir 32. FIG. 13 illustrates an exhaust filter assembly 142, comprising an air filter, fan, and an exhaust stack, mounted on vented reservoir cover 144.

Referring now FIG. 1, electrical power to operate various components of the transportable apparatus 10, such as plow blender 32, conveyor system 50, product conveyor belt system 72, control panel 28, and the hydraulic system for the three reservoir discharge control gate valves 26, 62, and 44 is supplied from an external source to an electric distribution system that is part of transportable apparatus 10. Electrical power may also be provided by a generator 112 integrated into third alternate transportable apparatus 17, as shown, for example, in FIG. 11.

Figures 6, 7:
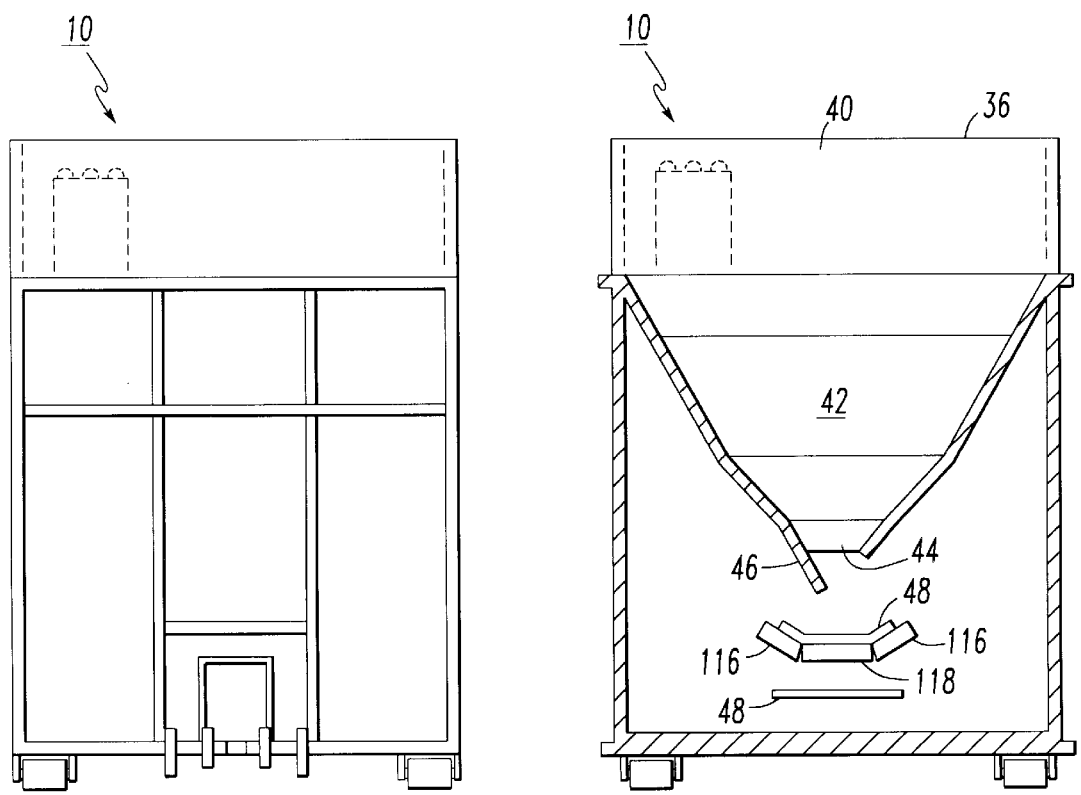
FIG. 6 is a end view of the front end of the first embodiment of the present invention illustrated in FIG. 1.
FIG. 7 is a cross-sectional view taken at line VII—VII of the first embodiment of the invention.

As shown in FIGS. 1–4, 7–8, and 11, conveyor system 50 is used to convey first stabilizer material 38 and auxiliary stabilizer material 54, which together comprise stabilizer material 15, after being discharged respectively from second reservoir 36 and auxiliary reservoir 52 to chute 30 leading into the plow blender inlet 34. As shown in FIGS. 3, 4, and 11, conveyor system 50 preferably includes rotating brusher bar 98 located at the discharge end of conveyor belt 48 which levels off stabilizer material 15 being carried by the conveyor belt so as to even out the delivery rate of stabilizer material 15 into plow blender 32. As shown in FIGS. 7 and 8, conveyor system 50 includes angled outer support rollers 116 and horizontal inner support rollers 118 to form the load carrying portion of conveyor belt 48 into a concave shape. The concave shape of conveyor belt 48 helps to contain stabilizer material 15 as it is being conveyed. Supporting structural members, the drive train, and the controls for conveyor system 50 are not shown. Conveyor system 50 is preferably controlled from control panel 28. Conveyor system 50 is removably secured to superstructure 14.

FIG. 11 illustrates a means for adjustably fixing the relative positions of the process material reservoirs and the plow blender. Incorporation of a means for adjustably fixing these relative positions is especially beneficial when the transportable apparatus is used as an accessory to a plow blender. In such as case, the means for adjustably fixing the relative positions of the plow blender and the process material reservoirs makes it possible to accommodate plow blenders of various sizes into the apparatus. The means for adjustably fixing the relative positions of the plow blender and the process material reservoirs shown in FIG. 11 includes positional platform 146 on which a plow blender, such as alternate plow blender 114, may be mounted. The means for adjustably fixing the relative positions of the plow blender and the process material reservoirs shown in FIG. 11 also includes a positioning mechanism 148 for variably positioning positional platform 146. Positioning mechanism 148 includes hydraulic cylinder 150 for lifting positionable platform 146 and a hydraulic power and control system. The controls for positioning mechanism 148 are preferably located near positionable platform 146.

While only a few embodiments of the present invention have been shown and described, it will be obvious to those skilled in the art that many changes and modifications may be made thereunto without departing from the spirit and scope of the invention. The foregoing detailed description has been given for clearness of understanding only, and no unnecessary limitations should be understood therefrom, as modifications will be obvious to those skilled in the art. Therefore, it is to be distinctly understood that the present invention is not limited to the described embodiments but may be otherwise embodied and practiced within the scope of the following claims.

What is claimed is:

1. A transportable apparatus for intimately combining a waste material with a stabilizer material comprising:

a) a first reservoir for receiving, containing, and discharging a waster material, said first reservoir having an inlet for receiving the waste material, an interior for containing the waste material, and an outlet for discharging the waste material;

b) a means for controllably discharging the waste material from the first reservoir;

c) a second reservoir for receiving, containing, and discharging a stabilizer material, said second reservoir having an inlet for receiving the stabilizer material, an interior for containing the stabilizer material, and an outlet for discharging the stabilizer material;

d) a means for controllably discharging the stabilizer material from the second reservoir;

e) a plow blender for intimately combining the waste material discharged from the first reservoir with the stabilizer material discharged from the second reservoir;

f) a superstructure for fixing the first and second reservoir and the plow blender in positions relative to each other, said superstructure having a means adapted for transporting the transportable apparatus from one location to another and g) positioning means for adjusting a relative position of at least one of said first reservoir, said second reservoir and said plow blender with respect to the others of said first reservoir, said second reservoir and said plow blender.

2. The transportable apparatus of claim 1, further comprising a means of conveying the waste material from the first reservoir to the plow blender.

3. The transportable apparatus of claim 2, wherein said means of conveying the waste material from the first reservoir to the plow blender includes a conveyor belt.

4. The transportable apparatus of claim 2, wherein said means of conveying the waste material from the first reservoir to the plow blender includes a chute.

5. The transportable apparatus of claim 1, further comprising a means of conveying the stabilizer material from the second reservoir to the plow blender.

6. The transportable apparatus of claim 5, wherein said means of conveying the stabilizer material from the second reservoir to the plow blender includes a conveyor belt.

7. The transportable apparatus of claim 5, wherein said means of conveying the stabilizer material from the second reservoir to the plow blender includes a chute.

8. The transportable apparatus of claim 1, further comprising a cover for at least partially closing the first reservoir inlet.

9. The transportable apparatus of claim 1, further comprising a cover for at least partially closing the second reservoir inlet.

10. The transportable apparatus of claim 1, wherein said means for controllably discharging the first reservoir includes a valve.

11. The transportable apparatus of claim 1, wherein said means for controllably discharging the second reservoir includes a valve.

12. The transportable apparatus of claim 1, further comprising at least one agitator for agitating the waste material within the first reservoir.

13. The transportable apparatus of claim 1, further comprising at least one agitator for agitating the stabilizer material within the second reservoir.

14. The transportable apparatus of claim 1, further comprising a means of conveying the combined waste material and stabilizer material away from the plow blender.

15. The transportable apparatus of claim 14, wherein said means of conveying the combined waste material and stabilizer material away from the plow blender includes a conveyor belt.

16. The transportable apparatus of claim 14, wherein said means of conveying the combined waste material and stabilizer material away from the plow blender includes a chute.

17. The transportable apparatus of claim 1, wherein the first reservoir interior has an inside surface, said inside surface having a covering of a material having a low coefficient of friction.

18. The transportable apparatus of claim 17, wherein the covering includes high density polyethylene.

19. The transportable apparatus of claim 1, wherein the second reservoir interior has an inside surface, said inside surface having a covering of a material having a low coefficient of friction.

20. The transportable apparatus of claim 19, wherein the covering includes high density polyethylene.

21. The transportable apparatus of claim 1, wherein said superstructure is comprised at least partially of steel.

22. The transportable apparatus of claim 1, wherein the first reservoir is an integral part of the superstructure.

23. The transportable apparatus of claim 1, wherein the second reservoir is an integral part of the superstructure.

24. The transportable apparatus for claim 1, wherein the positioning means includes means for adjustably fixing linear positions of the first and second reservoirs and the plow blender relative to each other.

25. The transportable apparatus for claim 1, wherein the positioning means for adjusting the positions of the first and second reservoirs and the plow blender relative to each other includes at least one hydraulic cylinder for adjusting the relative positions of at least one of the first and second reservoirs and the plow blender.

26. The transportable apparatus of claim 1, wherein said means adapted for transporting the transportable apparatus from one location to another include skids.

27. The transportable apparatus of claim 1, wherein said means adapted for transporting the transportable apparatus from one location to another include wheels.

28. An accessory to a plow blender comprising:
 a) a first reservoir for receiving, containing, and discharging a waste material, said first reservoir having an inlet for receiving the waste material, an interior for containing the waste material, and an outlet for the discharging waste material;
 b) a means for controllably discharging the waste material from the first reservoir;
 c) a second reservoir for receiving, containing, and discharging a stabilizer material, said second reservoir having an inlet for receiving the stabilizer material, an interior for containing the stabilizer material, and an outlet for discharging the stabilizer material;
 d) a means for controllably discharging the stabilizer material from the second reservoir;
 e) a superstructure for fixing the first and second reservoirs and the plow blender in positions relative to each other, said superstructure having a means adapted for transporting the accessory from one location to another; and
 f) positioning means for adjusting a relative position of at least one of said first reservoir, said second reservoir and the plow blender with respect to the others of said first reservoir, second reservoir and the plow blender.

29. The accessory to a plow blender of claim 28, further comprising a means of conveying the waste material from the first reservoir to the plow blender.

30. The accessory to a plow blender of claim 28, wherein said means of conveying the waste material from the first reservoir to the plow blender includes a conveyor belt.

31. The accessory to a plow blender of claim 29, wherein said means of conveying the waste material from the first reservoir to the plow blender includes a chute.

32. The accessory to a plow blender of claim 28, further comprising a means of conveying the stabilizer material from the second reservoir to the plow blender.

33. The accessory to a plow blender of claim 32, wherein said means of conveying the stabilizer material from the second reservoir to the plow blender includes a conveyor belt.

34. The accessory to a plow blender of claim 32, wherein said means of conveying the stabilizer material from the second reservoir to the plow blender includes a chute.

35. The accessory to a plow blender of claim 28, further comprising a cover for at least partially closing the first reservoir inlet.

36. The accessory to a plow blender of claim 28, further comprising a cover for at least partially closing the second reservoir inlet.

37. The accessory to a plow blender of claim 28, wherein said means for controllably discharging the first reservoir includes a valve.

38. The accessory to a plow blender of claim 28, wherein said means for controllably discharging the second reservoir includes a valve.

39. The accessory to a plow blender of claim 28, further comprising at least one agitator for agitating the waste material within the first reservoir.

40. The accessory to a plow blender of claim 28, further comprising at least one agitator for agitating the stabilizer material within the second reservoir.

41. The accessory to a plow blender of claim 28, further comprising a means of conveying the combined waste material and stabilizer material away from the plow blender.

42. The accessory to a plow blender of claim 41, wherein said means of conveying the combined waste material and stabilizer material away from the plow blender includes a conveyor belt.

43. The accessory to a plow blender of claim 41, wherein said means of conveying the combined waste material and stabilizer material away from the plow blender includes a chute.

44. The accessory to a plow blender of claim 28, wherein the first reservoir interior has an inside surface, said inside surface having a covering of a material having a low coefficient of friction.

45. The accessory to a plow blender of claim 44, wherein the covering includes high density polyethylene.

46. The accessory to a plow blender of claim 28, wherein the second reservoir interior has an inside surface, said inside surface having a covering of a material having a low coefficient of friction.

47. The accessory to a plow blender of claim 46, wherein the covering includes high density polyethylene.

48. The accessory to a plow blender of claim 28, wherein said superstructure is comprised at least partially of steel.

49. The accessory to a plow blender of claim 28, wherein the first reservoir is an integral part of the superstructure.

50. The accessory to a plow blender of claim 28, wherein the second reservoir is an integral part of the superstructure.

51. The transportable apparatus of claim 28 wherein the positioning means includes means for adjustably fixing linear positions of the first and second reservoirs and the plow blender relative to each other.

52. The transportable apparatus of claim 28 wherein the positioning means for adjusting the positions of the first and second reservoirs and the plow blender relative to each other includes at least one hydraulic cylinder for adjusting the relative positions of at least one of the first and second reservoirs and the plow blender.

53. The accessory to a plow blender of claim 28, wherein said means adapted for transporting the transportable apparatus from one location to another include skids.

54. The accessory to a plow blender of claim 28, wherein said means adapted for transporting the transportable apparatus from one location to another include wheels.

* * * * *